(No Model.) 7 Sheets—Sheet 4.

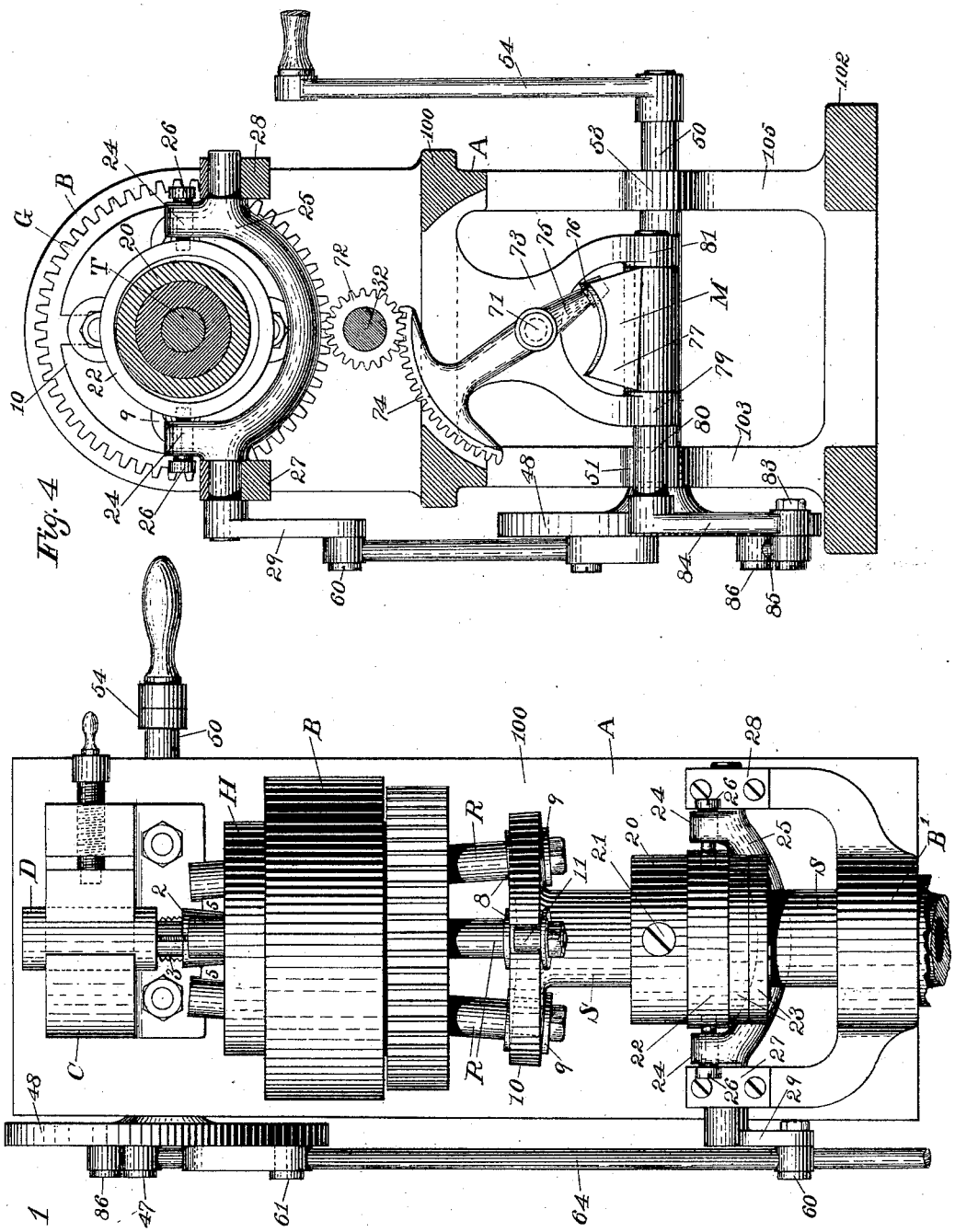

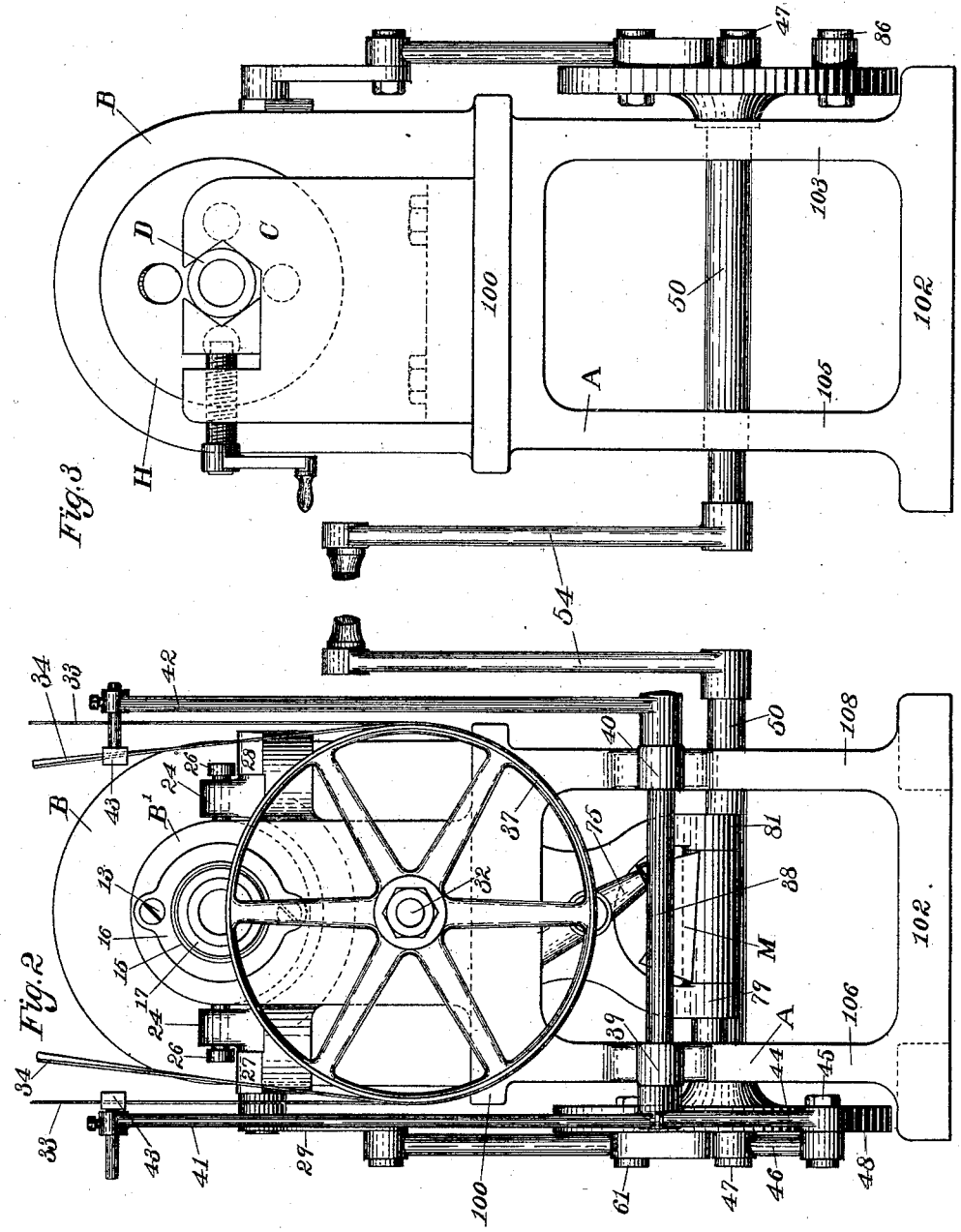

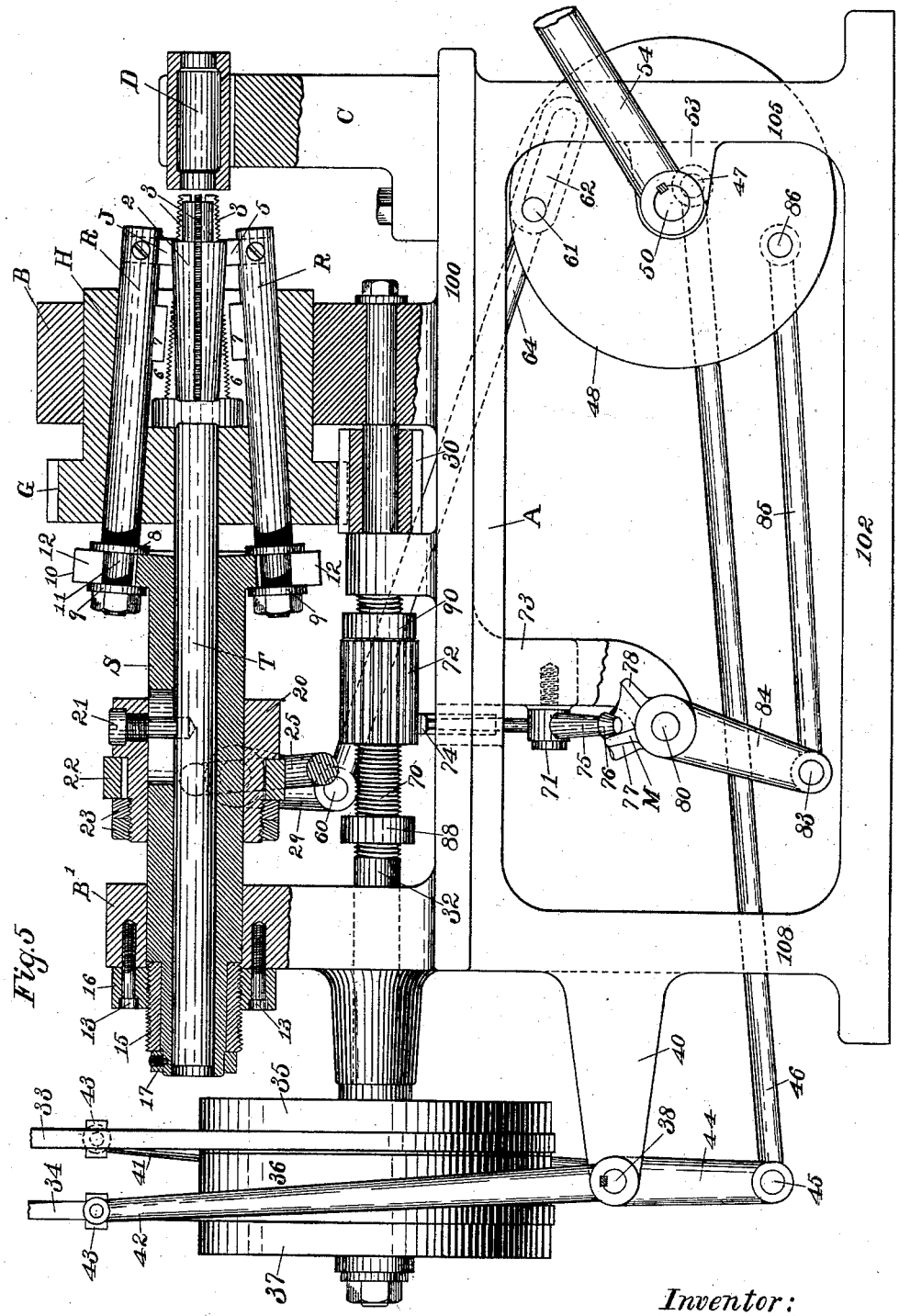

F. H. RICHARDS.
SCREW TAPPING MACHINE.

No. 415,846. Patented Nov. 26, 1889.

Witnesses: Henry L. Rickard. L. C. Heermann.

Inventor: Francis H. Richards (No Model.) 7 Sheets—Sheet 5.

F. H. RICHARDS.
SCREW TAPPING MACHINE.

No. 415,846. Patented Nov. 26, 1889.

Witnesses: Henry L. Reckard, L. C. Heermann.

Inventor: Francis H. Richards (No Model.) 7 Sheets—Sheet 6.
F. H. RICHARDS.
SCREW TAPPING MACHINE.

No. 415,846. Patented Nov. 26, 1889.

Witnesses:
Henry L. Reckard.
L. C. Heermann.

Inventor:
Francis H. Richards (No Model.) 7 Sheets—Sheet 7.
F. H. RICHARDS.
SCREW TAPPING MACHINE.
No. 415,846. Patented Nov. 26, 1889.
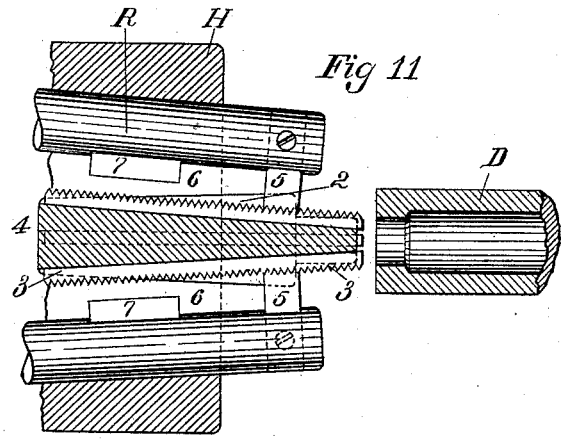
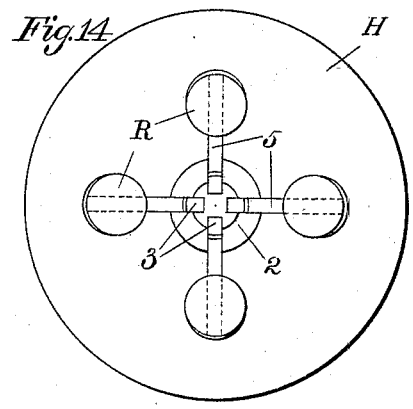
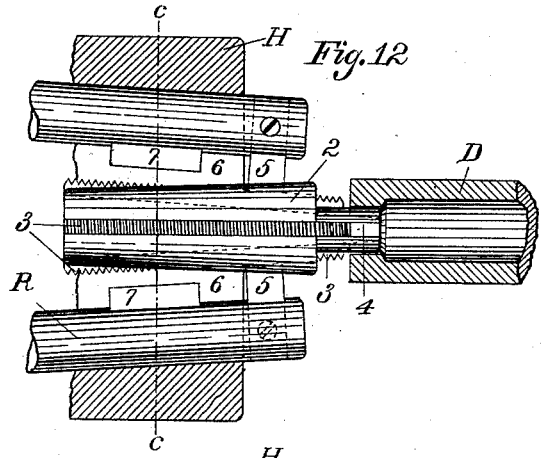
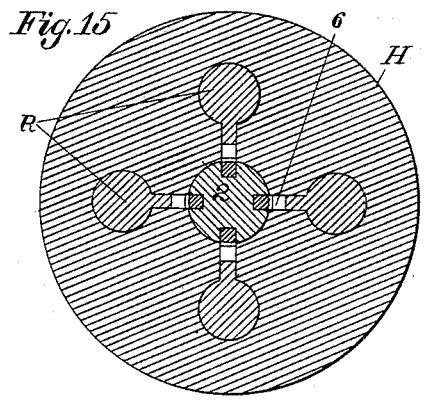
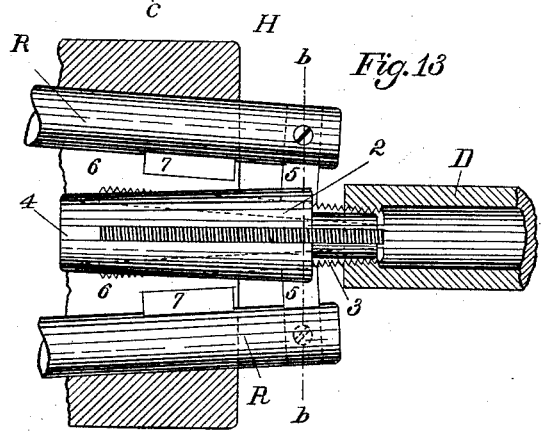
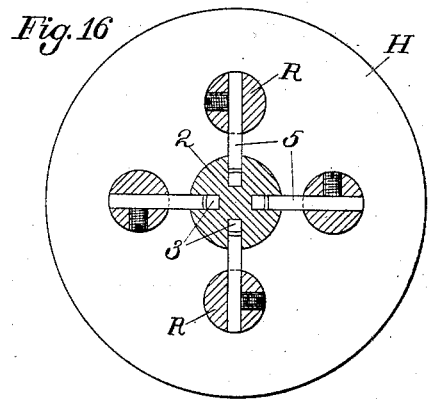
Witnesses:
Henry L. Rickard.
L. C. Heermann.
Inventor:
Francis H. Richards

UNITED STATES PATENT OFFICE.

FRANCIS H. RICHARDS, OF HARTFORD, CONNECTICUT.

SCREW-TAPPING MACHINE.

SPECIFICATION forming part of Letters Patent No. 415,846, dated November 26, 1889.

Application filed February 18, 1889. Serial No. 300,296. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Screw-Cutting Machines, of which the following is a specification.

This power-actuated screw-cutting machine cuts the threads of tapered screws—such as the threads of pipe-fittings and the like—by means of chasers having an advancing motion parallel to the threaded surface, and which are automatically reversed and withdrawn when the thread is completed. It is in the nature of an improvement on the invention described in my application, Serial No. 286,611, filed September 27, 1888.

Figure 6:
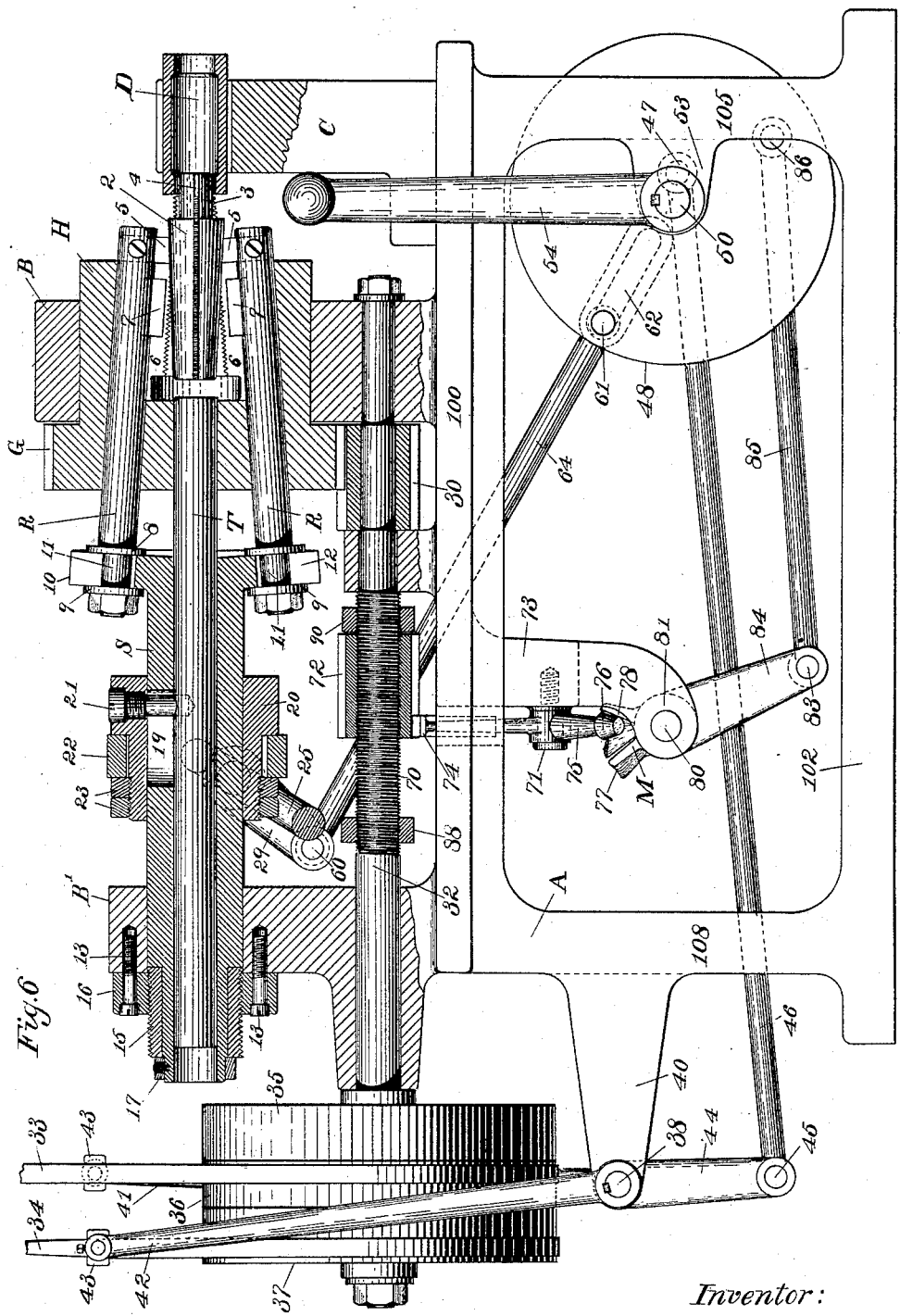
Figure 7:
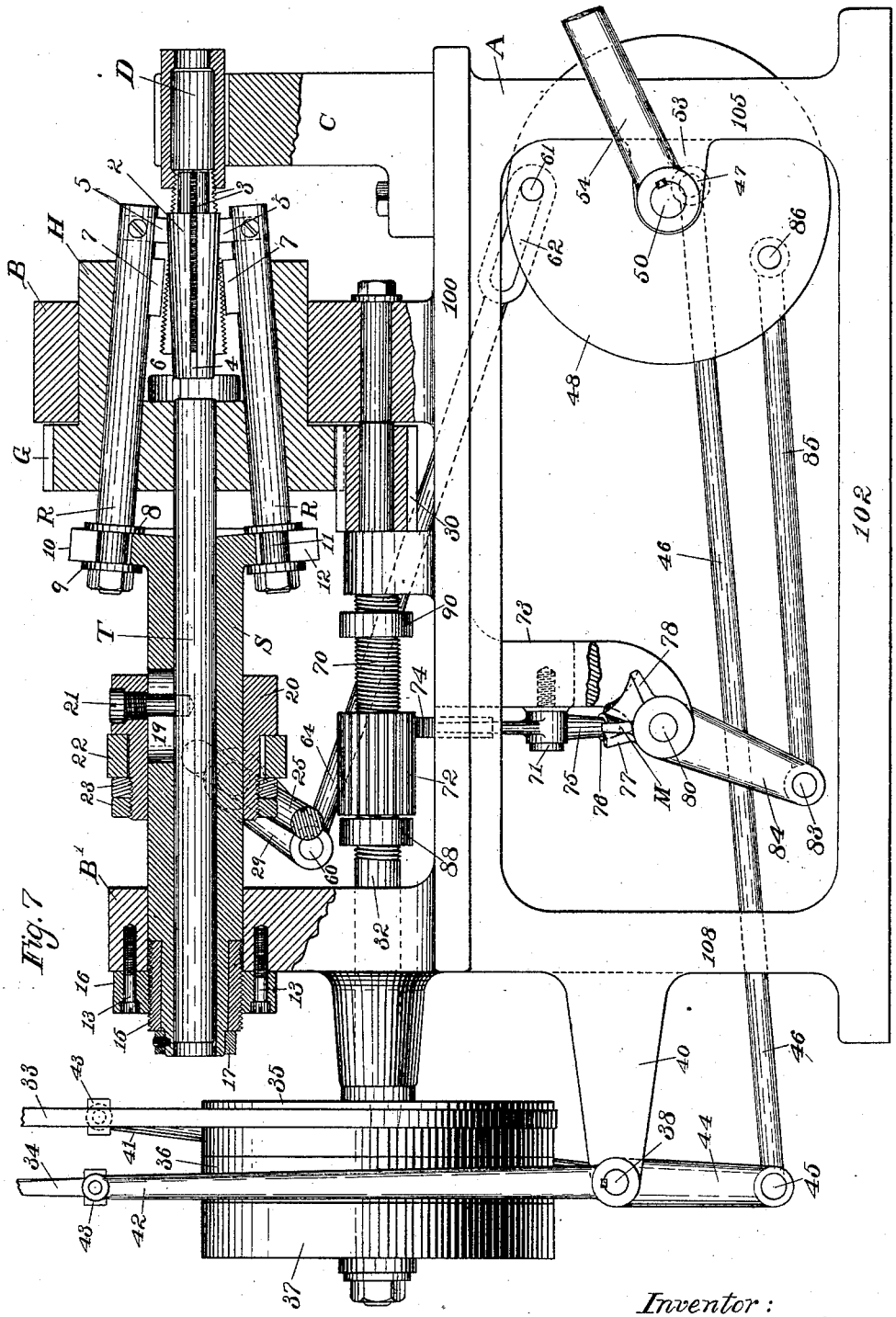
Figure 8:
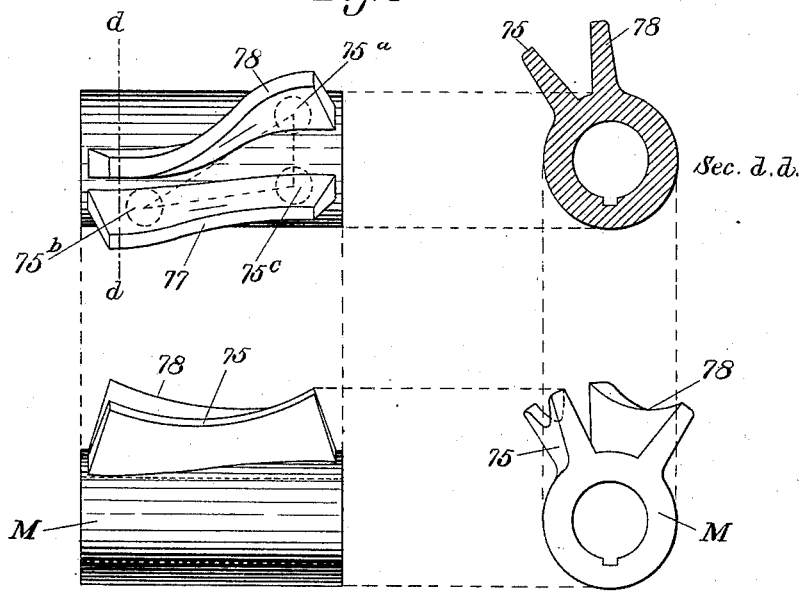
Figure 9:
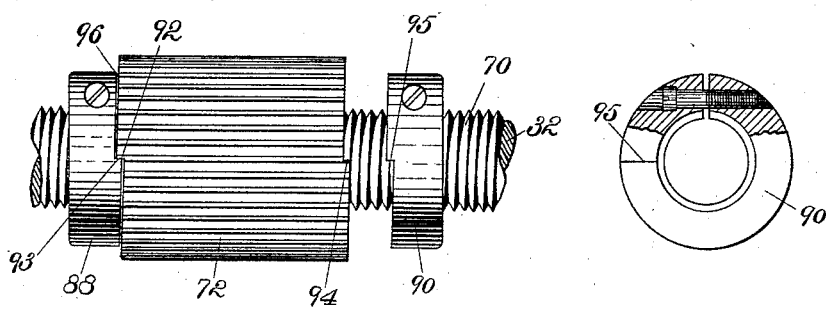
Figure 10:
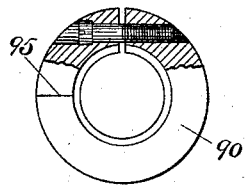

In the drawings accompanying and forming a part of this specification, Figure 1 is a plan view, with some details broken away, of a screw-cutting machine embodying my present improvements. Fig. 2 is an elevation of the left-hand end of the machine. Fig. 3 is an elevation of the right-hand end of the same. Fig. 4 is a vertical transverse section forward of the rear spindle-bearing. Fig. 5 is a front elevation, partially in section, showing the parts in position ready for operation. Fig. 6 is a similar view showing the spindle thrown forward and the machine started operating. Fig. 7 is another similar view showing the parts after the completion of the thread and after the movement of the chasers has been automatically reversed. Fig. 8 shows, in four enlarged detail views drawn in projection, the reversing-cam. Fig. 9 is a view of the reversing-pinion and adjustable stop-collars on the threaded shaft. Fig. 10 is a side view, partially in section, of one of said collars. Fig. 11 is a longitudinal sectional view of the spindle-head and threading-tool and shows these parts in the position shown in Fig. 5. Fig. 12 is a similar view in which the positions of the several details correspond to those in Fig. 6. Fig. 13 is a similar view in which the said positions correspond to those in Fig. 7. Fig. 14 is a front view of the parts in Fig. 11 and drawn in projection thereto. Fig. 15 is a section in line *c c*, Fig. 12. Fig. 16 is a section in line *b b*, Fig. 13.

Similar characters designate like parts in all the figures.

The frame-work of the machine, which is designated in a general way by A, may be of any form and construction suitable to carry the several details. On this frame I place the main bearing B, the rear bearing B', and also the chuck C, or some other device or apparatus for holding the article D to be threaded. This article, as shown in the drawings, is supposed to be an ordinary cast-iron pipe-coupling; but a variety of other well-known articles may be properly threaded in my machine, and for the chuck or work-holder C, I may use any well-known device for like purpose. The said bearings may or may not be formed integral with the frame-work by which they are supported. As shown, this frame-work comprises the top plate 100, carrying the bearings B and B' and the work-holder C, the base-frame 102, and the uprights 103 105 106 108. On these several portions are formed or affixed the bearings for the several shafts and levers, as hereinafter set forth.

My improved machine has a revolving spindle, one or more chasers having an advancing motion at an inclination to the axis of the screw-thread being cut, and means for so advancing the chasers. The spindle consists (or may consist) of the stem T and the spindle-head H, rigidly affixed thereto by usual means, (not shown,) which means may consist in a driving fit of the stem in said head, supplemented by a key, or by a pin crosswise through the head and stem. This spindle-head carries the chaser-actuating stems R, and is fitted to revolve in the bearing B on the frame A. The stem T extends rearward from and furnishes the means for sliding the spindle-head H in its bearing, it being provided with the devices for such purpose. The spindle is revolved by means of the gear G formed thereon, which meshes with the driving-pinion 30, that is fixed on the driving-shaft 32, which shaft is carried in bearings, substantially as shown, and is provided with the fast pulley 36 and the reversely-revolving loose pulleys 35 and 37, fitted thereon in a well-known manner. Two belts 33 and 34, one of them a crossed belt, are employed to drive said pulleys in the usual way. For properly "shipping" these belts a rock-shaft 38 is carried in bearings 39 40 on posts 106 108, and is provided with two shipper-levers 41 42, one for each belt 33 and 34, respectively, said levers being each furnished with the usual belt-guide 43. The shaft 38 is operated by means of the arm 44 and the connecting-rod 46, attached to said arm at 45 and at 47 to a crank-pin fixed in disk 48 of the reversing-shaft 50, which shaft is carried in bearings 51 53 on posts 103 and 105, respectively. This shaft is furnished with a hand-lever 54, for operating the same by hand. The three positions of said hand-lever are shown in Figs. 5, 6, and 7. In Fig. 6 the lever 54 is thrown fully over to the left hand, and the shaft 32 is revolving forward by belt 33 on pulley 36, the belt 34 being on pulley 37. In Fig. 7 the lever 54 is thrown fully over to the right hand and the shaft 32 is reversely revolved by belt 34 on pulley 36, the belt 33 being now on pulley 37. In the intermediate position in Fig. 5 the belts are both on loose pulleys, and the shaft 32 is at rest.

The screw-cutting tap used in this machine consists, or may consist, of a central core or arbor 2, having a series of grooves 4, adapted to receive the sliding chasers 3 for cutting the thread. Said arbor is usually fitted with a taper, as shown, after the well-known manner of fitting the stems or shanks of "lathe-centers" and drill-chucks. An ordinary key (not shown) is usually employed to prevent rotation of the arbor 2 in the head H, said key being located midway between two adjacent grooves 4. The grooves 4 are formed parallel to the stems R, and the latter are each furnished with a driver 5, rigidly clamped or fixed thereto and firmly engaging with the chaser. This engagement I usually effect by forming the inner end of the driver to mesh with the teeth of the chaser. This feature is well shown in Fig. 11. Between the core 2 and the chaser-driving stems R slots 6 are formed, into which the driver 5 may enter as the stems are drawn back. Said stems are each provided with a key 7, which fits in the slot 6, to prevent them revolving, the stems being in practice made cylindrical to facilitate construction. For operating the stems R in the head H, I provide them with collars 8 9, between which I fit the flange 10 of the sleeve S, the intermediate part 11 of the stem fitting in the slot 12 formed in said disk. The sleeve S slides on the stem T of the spindle, and carries at its outer end the guide-screw 15, which fits in the guide-nut 16, that is fixed to bearing B' by screws 13 or otherwise. The screw 15 is held in place on the part S by a collar 17, affixed to said part in any well-known manner. The pitch of the screw 15 should exactly correspond to the pitch of the chasers being used in the machine, so that when one is replaced by parts of a different pitch the other is similarly changed.

For sliding the spindle, a sleeve 20, fitting freely on the part S, is rigidly connected by a screw or stud 21 to the stem T of said spindle through a slot 19, formed in the sleeve S. The sleeve 20 has thereon a collar 22, held in place by check-nuts 23, which is carried by and between the two arms 24 of the rock-shaft 25, which arms have pivots 26 entering sockets in said collar 22. The shaft 25 is carried in bearings 27 28, and has fixed thereon an arm 29, which is connected at 60 to the connecting-rod 64, that is operated by the pin 61 in disk 48, which pin works in the slot 62 formed in the said rod. When the disk 48 is thrown into its position in Fig. 6, the pin 61 stands in line between shaft 50 and pin 60, so that the spindle is firmly held, as by a toggle-joint, in the forward position, with gear G against the main bearing B; but on turning the disk over to the right, as in Fig. 7, the pin 61 moves in the slot 62, and does not retract the rod 64 nor the spindle. The object of this arrangement is to permit the spindle and chasers, after the latter have been driven fully forward, as in Fig. 7, to be withdrawn together, so that the chaser-points will always be supported by the core 2, and not left projecting beyond the same, as would obviously be the case if the core were to be retracted by the said movement of the disk 48.

The apparatus for automatically operating the belt-shipping devices I construct as follows: On the shaft 32 there is formed a traverse screw or thread 70, and on this the clutch-pinion 72 is fitted as a nut. This pinion meshes with the segment 74, which is pivoted at 71 to a bracket 73, depending from the plate 100. The segment has an arm 75, whose point 76 (which is preferably a conical roller) engages between and with the leaves or wings 77 78 of the reversing-cam M on shaft 80, which shaft is carried in bearings 79 81 on the bracket 73. The shaft 80 has an arm 84 fixed thereto, and attached at 83 to a connecting-rod 85, which is attached at its opposite end at 86 to the disk 48. If, now, the pinion 72 be turned, the arm 76 strikes the cam M, turns the shaft 80, and through the connection turns disk 48, and this disk, through its other connections described, operates the belts either to reverse or to stop the machine, as the case may be.

The pinion 72 is revolved at the proper time by clutch-collars 88 90, adjustably fixed on the threaded part 70 of the main shaft 32. To prevent the pinion sticking against the said collars, owing to the fineness of screw 70, I form thereon oppositely-disposed clutch-faces 92 94 and corresponding faces 93 95 on the collars 88 and 90, respectively. (See Fig. 9.) By means of this construction a little space may be left at 96, so that all tendency of said parts to adhere or stick together is avoided. The shaft 32 being revolved in one direction, the pinion (this being loosely fitted thereon) is carried endwise until it engages with one of the collars 88 or 90, and through this collar is turned with the shaft to actuate the several connections described and reverse or stop the machine.

The arm 75 works between the two cam-wings 77 and 78, as aforesaid; but it will be noticed, as seen best in Fig. 8, that said wings are not parallel throughout their length. When the machine is running forward, the arm 75 stands (at 75ª in Fig. 8) against the wing 78, as in Fig. 6, and thus continues until the pinion 72 engages collar 88 and throws the arm 75 to its position in Fig. 7, corresponding to 75ᵇ in Fig. 8, and the machine is reversed. The arm 75 then stands as last stated until the said pinion engages collar 90, when said arm is thrown over to its position in Fig. 5, corresponding to 75ᶜ in Fig. 8, and the machine is stopped. On starting the machine again, the cam M being operated by hand, the arm 75 passes directly from position 75ᶜ to position 75ª, after which the said series of movements are repeated. The extent of the movement of the machine before the same is reversed or stopped is of course governed by the distance apart at which the collars 88 and 90 are set on the main shaft, and this distance in practice is adjusted experimentally to correspond with the length of thread to be cut.

The chasers 3 are in practice made of considerable length, as shown, and are driven by the engagement of the driver 5 with the chaser-teeth near the point of the chaser. By this means the chaser may be moved out as the point wears away, nearly the whole length of the chaser being ultimately utilized.

In using the machine, the chasers being retracted, as in Figs. 5 and 11, the operator clamps in position the piece D to be threaded and then throws the handle 54 from its position in Fig. 5 to that in Fig. 6. This drives forward the spindle H and projects the point of the core 2 into said piece D, as in Fig. 12, at the same time shifting the belts, as aforesaid, to start the machine. Next the chasers as they are revolved are fed forward by the guide or lead screw and chase out the thread in said piece D. This operation continues until the work is finished, as in Fig. 13, when the collar 88 engages pinion 72 and causes the machine to be reversed, as before set forth. The spindle, the sleeve S, the drivers R, and the chasers then move back together to their original position, when the machine is stopped, as aforesaid, by the belt-shipping devices and stands ready for another operation.

Having thus described my invention, I claim—

1. The combination of a spindle provided with a core grooved to receive chasers, the chasers, and sliding stems carried by the spindle and provided with chaser-drivers, substantially as described, engaging the chasers to slide these in the grooves, all substantially as described.

2. The combination of a spindle provided with a core having chaser-receiving grooves inclined to the axis thereof, chasers in said grooves, and chaser-driving stems carried by the spindle and connected with the chasers by chaser-drivers and having their movement parallel to the inclination of said grooves, all substantially as described.

3. The combination of the spindle, the chaser-receiving core, the chasers, the chaser-driving stems provided with chaser-drivers, and the guide-screw connected to actuate said stems in said spindle, all substantially as described.

4. The combination of the spindle, the chaser-receiving core carried thereby, the chasers adapted to slide in the grooves of said core, the stems R, having drivers 5 engaging with the chasers, substantially as described.

5. The combination of the spindle-head H, having slots 6, the core 2, having grooves 4, chaser 3, stem R, a key preventing rotation of said stem, and a driver connecting the stem to the chaser to slide in its groove, substantially as described.

6. The combination of the spindle and core constructed, substantially as described, to carry the chasers, the chasers arranged to slide substantially as described, chaser-drivers, substantially as described, carried by the spindle, a guide-screw connected to actuate the chaser-drivers, and connecting devices, substantially as described, operatively connected to slide the spindle independently of said drivers, substantially as described.

7. The combination of the spindle-head H, carrying the chasers and having stem T, the chasers, the chaser-drivers, sleeve S, connected to said drivers, the sleeve 20, connected to said stem T, and sleeve-actuating devices, substantially as described, and sliding sleeve 20 on sleeve S, substantially as described.

8. The combination of the spindle, the chasers, the guide-screw connected, substantially as described, to slide the chasers, the sleeve connected to the spindle, the main shaft 32, having screw 70, the reversing-shaft, connections, substantially as described, from the reversing shaft to operate said spindle-actuating sleeve, the clutch-pinion and collars, and a cam and connections, substantially as described, intermediate to said pinion and reversing-shaft, all substantially as described.

9. In a screw-cutting machine, the combination, with the spindle, chasers, guide-screw, and mechanism, substantially as described, operating the chasers from the guide-screw, of the shaft 32, geared to drive the spindle, and having thread 70, pinion 72, collars 88 and 90, cam M, a lever, substantially as described, operating said cam from said pinion, and connections, substantially as described, operating the belt-shippers from said cam, all substantially as described.

10. In a screw-cutting-machine, the combination, with the spindle having head H and stem T, of the sleeve S, having flange 10 slotted at 12, and the chaser-driver set at an inclination to the spindle-axis and engaging with said flange, said driver passing through said slot, substantially as described.

11. In a screw-cutting machine, the combination of shaft 32, carrying and actuating pinion 72, substantially as described, the pulleys on said shaft, the belt-shippers, intermediate connections between said shippers and disk 48, the cam M, the disk 48, connections between said disk and cam M, and means, substantially as described, operating said cam from said pinion, all substantially as described.

FRANCIS H. RICHARDS.

Witnesses:
HENRY L. RECKARD,
LEWIS C. HEERMANN.